Nov. 5, 1957     C. A. CHIRONIS     2,811,914
MACHINE FOR COOKING EDIBLE ARTICLES IN DEEP FAT
Filed Feb. 14, 1957     3 Sheets-Sheet 1
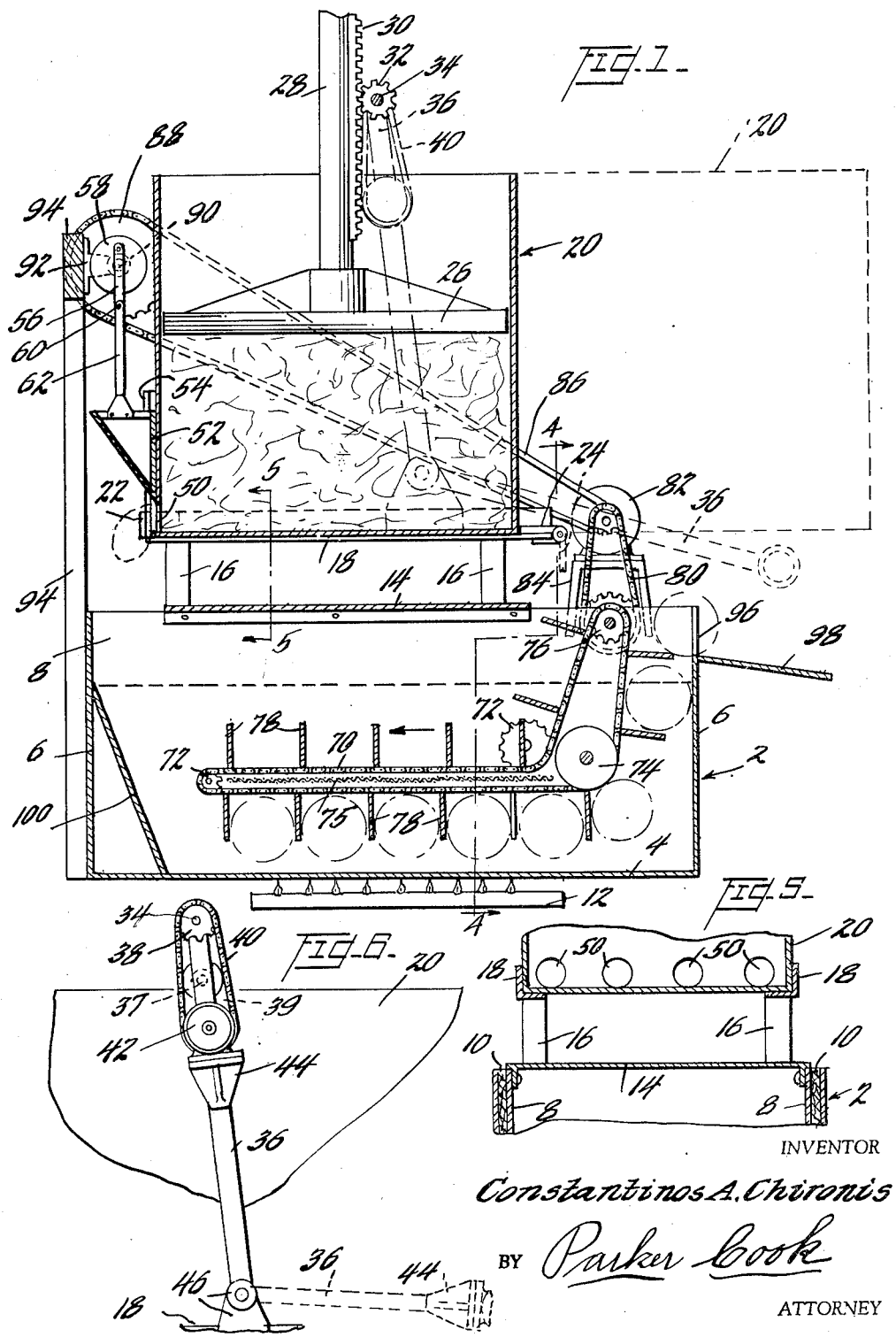
INVENTOR
Constantinos A. Chironis
BY Parker Cook
ATTORNEY

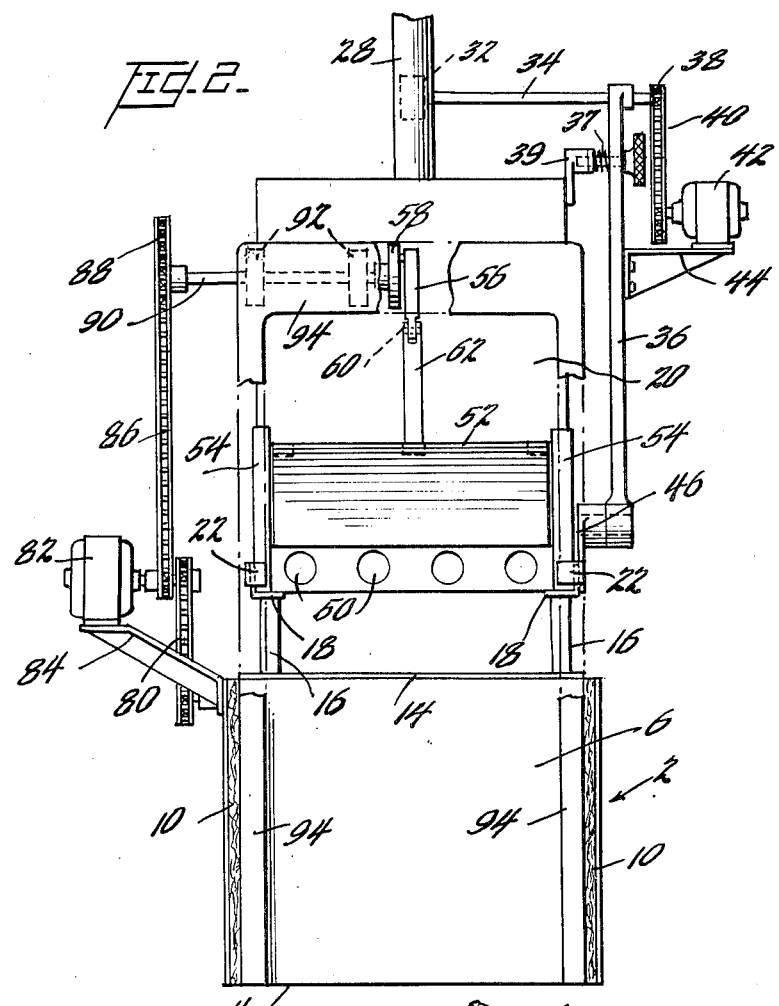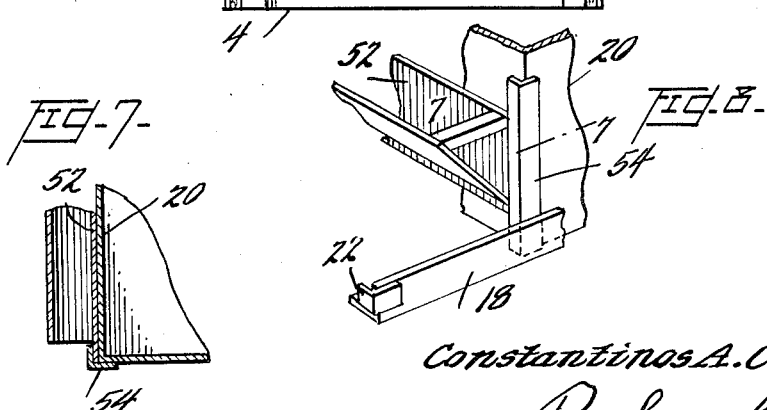

Nov. 5, 1957 C. A. CHIRONIS 2,811,914
MACHINE FOR COOKING EDIBLE ARTICLES IN DEEP FAT
Filed Feb. 14, 1957 3 Sheets-Sheet 3
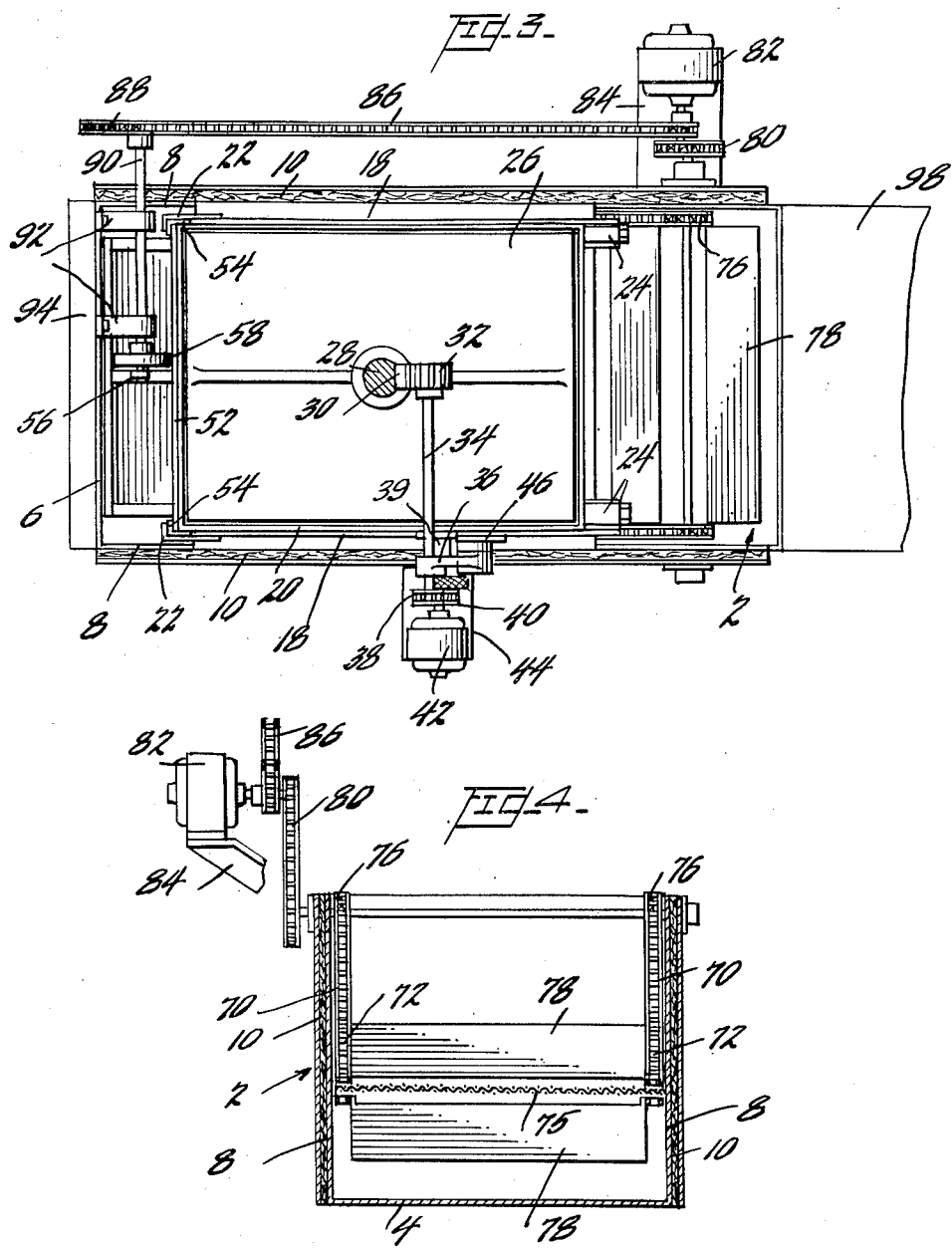
INVENTOR
Constantinos A. Chironis,
BY Parker Cook
ATTORNEY

2,811,914

MACHINE FOR COOKING EDIBLE ARTICLES IN DEEP FAT

Constantinos A. Chironis, Atlantic City, N. J.

Application February 14, 1957, Serial No. 640,243

1 Claim. (Cl. 99—353)

My invention relates to a new and useful improvement in a machine for cooking edible articles in deep fat and wherein the operation will be continuous.

One of the objects of the invention is to provide a machine provided with a removable hopper in which the desired batter is to be poured, and then this batter put under pressure and portions of the batter forced through openings and then sliced to in turn drop into the hot fat or oil, and, as they start to rise they will be engaged by a conveyor that moves them through the hot fat or oil, then runs them up an incline and then drops them into a receptacle.

Still another object of the invention is to provide a machine for cooking doughnuts, waffles and other edible articles that are compounded from the batter placed in the hopper.

Still another object of the invention is to provide a machine as above mentioned wherein the upper hopper is easily and quickly removable after it is empty so that a new one can quickly be placed in position; and while the batter from the one just installed is being used, the hopper just removed may be washed and filled with a new batch of batter.

Another object of the invention is to provide the hopper with several openings so that as the batter is forced through these openings and a reciprocal knife cuts off the batter to the desired thickness, several of the articles, for instance, doughnuts, may be cooked or processed at the one time.

Another object of the invention is to provide a machine with but two relatively small motors so that the cost of operation of the machine may be reduced to a minimum.

With these and other objects in view, the invention consists in certain new and novel arrangements and combinations of parts as will be hereinafter more fully described and pointed out in the claim.

Referring now to the drawings, showing a preferred embodiment,

Fig. 1 is a vertical, longitudinal section through the machine,

Fig. 2 is an end elevation, looking from the left of Fig. 1,

Fig. 3 is a top plan view,

Fig. 4 is a vertical cross section taken on line 4—4 of Fig. 1,

Fig. 5 is a similar view taken on line 5—5 of Fig. 1,

Fig. 6 is a view of the swinging arm and associated parts for moving the plunger, Fig. 7 is a detailed, longitudinal, sectional view of a corner of the hopper and the knife and its guide, and Fig. 8 is a perspective view of the same parts.

It might be mentioned briefly that the broad concept is to provide a tank in which there is to be hot fat and a conveyor in the tank. Mounted above the tank is a removable hopper in which the batter is to be placed, and the batter to be put under pressure and then extruded from openings on one side, and a knife to cut off certain thicknesses of the batter that will fall into the tank and after they rise they will be carried through the hot fat and then out the other side of the tank.

My machine comprises a tank 2 having a bottom 4, front and rear walls 6, and side walls 8. The side walls may have asbestos covering 10 to confine the heat in the tank and a heater 12 may be provided below the bottom 4 to heat the fat in the tank 2. A plate 14 (Fig. 1) is secured to the upper edge of the side walls 8, forming a partial closure for the tank, but leaving an open space between the edges of the plate and the front and rear walls.

Legs 16 (Fig. 5) are secured to the plate in any manner and support angle irons 18 which form slides for a dough hopper 20. Secured to the forward edge of the angle irons 18 are stops 22 (Fig. 8) which limit the forward movement of the hopper, and lugs 24 (see Fig. 1) are pivoted to the rear edges of the angle irons and when in place prevent rearward movement of the hopper 20. It will thus be seen that the stops 22 and lugs 24 properly position the hopper and hold it against movement.

A plunger 26 (Fig. 1) is vertically movable in the hopper 20 to press down the dough and has a rod 28 fastened to it which carries a rack 30. The rack 30 is driven from a pinion 32 mounted on the shaft 34, the latter carried on an arm 36. On the other end of the shaft 34 (Fig. 2) is a sprocket 38 driven by a chain from a motor 42 mounted on a bracket 44, the latter being bolted to the arm 36. The arm 36 is pivoted at its lower end to a bracket 46 secured to one of the angle irons 18 and may be locked in place by a spring-pressed pin 37 passing through the arm and entering a hole in a bracket 39 secured to the side wall of the hopper 20.

When it is desired to remove the dough hopper and put another one in place, the arm 36 is swung down to the dotted position shown in Figs. 1 and 6, the lugs 24 are flipped to the dotted position shown in Fig. 1, and the hopper may be slid to the right (Fig. 1) and replaced with another hopper.

In the front wall of the hopper wall are a series of openings 50 (Fig. 2) through which dough is extruded and these wads of dough are cut off by a reciprocating knife blade 52 carried in guides 54 (Fig. 2) on the edges of the hopper 20.

The knife is reciprocated by a crank arm 56 (Figs. 1 and 2), connected to a crank disk 58, the crank arm being pivotally connected at 60 to an arm 62 secured to the knife. When removing the hopper to replace it with a new one, the pin 60 is removed and the knife blade slid out of its guides 54 and replaced in similar guides on the fresh hopper. The crank disk 58 is driven by means which will later be described.

An endless conveyor 70 is mounted in the tank 2 on the rollers and sprockets 72 and 74 and is driven by a sprocket 76. The conveyor carries paddles or partitions or flights 78. A screen 75 extends between the side walls of the tank 2 and between the upper and lower reaches of the conveyor 70 so as to prevent any possibility of the doughnut rising too high in the tank while moving from front to back.

The sprocket 76 is driven through a chain and sprocket 80 (Figs. 2 and 4) forming a gear reduction from a motor 82 mounted on a bracket 84 secured to one of the side walls of the tank. The motor 82 also drives a chain 86 which in turn drives a sprocket 88 (Fig. 1) mounted on a shaft 90 on the opposite end of which is the crank disk 58. The shaft 90 is rotatable in bearings 92, the latter being mounted on a frame 94 fastened to and extending upwardly from the tank 2.

It will thus be seen that the motor 82 drives the conveyor 70 and the paddles 78 will move the doughnut from one end of the machine to the other, raising them up to the top of the tank and out of the fat where they are discharged through an opening 96 in the rear wall of the tank and dropped onto a platform or conveyor 98.

At the same time the motor 82 drives the shaft 90 reciprocating the knife blade 52 which cuts off the gobs of dough discharged through the openings 50, allowing them to drop into the hot fat in the tank 2. An inclined wall 100 secured to the front wall of the tank moves the gobs slightly rearward so they will be picked up by the flights 78, it being understood, of course, that the dough after dropping into the hot fat will not lie on the bottom of the tank but will rise so as to be in the path of the paddles 78.

It will be understood that the downward movement of the plunger 26 will be just great enough to always keep the dough under pressure so that it will extrude from the openings 50. It will also be understood that the movement of the knife 52 will be synchronized with the movement of the conveyor 70 so that the disks of batter will be continually dropping into the hot fat, but not at a rate faster than the conveyor can handle them, and will permit them to cook so that these disks of batter will never pile up in the tank.

I have not shown the electrical means for controlling these operations, but it will be understood that the operations are electrically timed so that the batter can be continually sliced, dropped into the tank, cooked and ejected from the tank in a continuous operation.

It will also be understood that it is but a matter of a moment to remove the hopper from above the tank and place a new one therein in which fresh batter has been supplied.

It will also be understood that throughout the specification I have used the word "doughnuts" but any kind of edible products, made out of batter, that are to be cooked in hot fat may be run through the machine and cooked.

Many slight changes might be made without departing from the spirit and scope of the invention. Having thus described my invention, what I claim as new and desire to secure by Letters Patent is:

A machine for cooking articles in a deep fat, comprising a tank for holding the fat, a heater beneath the tank, an endless conveyor mounted in the tank, means for operating the same, the conveyor provided with a plurality of outstanding partitions; a removable hopper mounted above the tank for holding batter, the hopper provided with a plurality of openings above the confines of the tank; a removable plunger within the hopper having an upstanding rack; a pivotal arm mounted to the side of the tank, the arm provided with a motor and a driven pinion for engaging the said rack to force the said plunger downwardly to force the batter through the openings; a reciprocal knife for cutting off the desired thickness of slices of batter forced through the openings, the conveyor moving the said slices as they rise through the hot fat to the far side of the tank and then upwardly so that they may drop from the tank when they reach a level above the level of the top of the tank.

References Cited in the file of this patent
UNITED STATES PATENTS

| | | |
|---|---|---|
| 1,391,212 | Schaller | Sept. 20, 1921 |
| 1,506,232 | Fleming | Aug. 26, 1924 |
| 2,463,112 | Kipnis | Mar. 1, 1949 |